United States Patent [19]

Escaravage

[11] Patent Number: 4,801,156
[45] Date of Patent: Jan. 31, 1989

[54] DEVICE FOR ADJUSTING THE POSITION OF A STRAP RETURN ELEMENT OF IN PARTICULAR A SAFETY BELT FOR A MOTOR VEHICLE

[75] Inventor: Gérard Escaravage, Valentigney, France

[73] Assignee: ECIA—Equipements et Composants Pour L'Industrie Automobile, Audincourt, France

[21] Appl. No.: 161,342

[22] Filed: Feb. 19, 1988

Related U.S. Application Data

[63] Continuation of Ser. No. 922,498, Oct. 23, 1986, abandoned.

[30] Foreign Application Priority Data

Oct. 24, 1985 [FR] France ................ 85 15830
Feb. 7, 1986 [FR] France ................ 86 01716

[51] Int. Cl.⁴ .............................................. B60R 22/20
[52] U.S. Cl. ..................................... 280/808; 297/483
[58] Field of Search ............... 280/801, 802, 804, 808; 297/469, 483; 310/191, 209, 15, 16, 17, 80; 200/1 V, 16 C, 16 D, 16 F

[56] References Cited

U.S. PATENT DOCUMENTS

| | | |
|---|---|---|
| 4,256,331 | 3/1981 | Schwanz et al. ............ 280/808 |
| 4,547,717 | 10/1985 | Rodermecher ............... 280/804 |
| 4,616,850 | 10/1986 | Sedlmayr .................... 280/808 |

FOREIGN PATENT DOCUMENTS

| | | |
|---|---|---|
| 0092105 | 10/1983 | European Pat. Off. . |
| 0136166 | 4/1985 | European Pat. Off. . |
| 7523101 | 7/1975 | Fed. Rep. of Germany . |
| 2107446 | 5/1972 | France . |
| 2513887 | 4/1983 | France . |
| 58-167205 | 11/1983 | Japan . |
| 2091537 | 8/1982 | United Kingdom . |

Primary Examiner—David M. Mitchell
Assistant Examiner—Karin L. Ferriter
Attorney, Agent, or Firm—Sughrue, Mion, Zinn, Macpeak, and Seas

[57] ABSTRACT

The device for adjusting the position of a strap return element (1) of in particular a safety belt for a motor vehicle is characterized in that the strap return element is mounted to be movable between two end positions by driving means comprising an electric motor supplied with current through the medium of a control element controlling the position of the strap return element at any point of the travel of the latter defined by the two end positions. The strap return element (1) is disposed on an anchoring pin (4) mounted on the stator of the electric motor whose hollow rotor is provided with an internal screwthread cooperating with a screwthreaded rod mounted on the vehicle for shifting the electric motor and therefore the strap return element.

9 Claims, 3 Drawing Sheets

DEVICE FOR ADJUSTING THE POSITION OF A STRAP RETURN ELEMENT OF IN PARTICULAR A SAFETY BELT FOR A MOTOR VEHICLE

This is a continuation of application Ser. No. 06/922,498 filed Oct. 23, 1986 now abandoned.

The present invention relates to a device for adjusting the position of a strap return element of in particular a safety belt for a motor vehicle.

On most vehicles, this strap return element is disposed on an anchoring pin fixed to the body of the vehicle at a height appropriate for a majority of users of so-called normal size.

However, this height is not suitable for some users, in particular persons of small size.

For solving this problem, a number of mechanical devices are known in the prior art for adjusting the height of this strap return element.

However, these devices have a number of drawbacks, in particular in respect of the possibilities of adjustment, their relatively complex structure and therefore their relatively high manufacturing and mounting costs.

An object of the invention is to solve the problems mentioned hereinbefore by proposing a device for rapidly and precisely adjusting the position of the strap return element so as to adapt it to the morphology of the user.

The invention therefore provides a device for adjusting the position of a strap return element of in particular a safety belt for a motor vehicle, in which said strap return element is mounted to be movable between two end positions by driving means comprising an electric motor supplied with current through the medium of a control element setting the position of said return element at any point of the travel of the latter defined by the two end positions, said strap return element being disposed on an anchoring pin mounted on the electric motor, said electric motor being mounted to be axially movable between the two end positions, wherein the pin is mounted on the stator of the electric motor, said stator comprising projecting portions cooperating with means for guiding the movement of and retaining the motor which are connected to the body of the vehicle, the motor guiding and retaining means comprising a metal plate having folded edge portions cooperating with the projecting portions of the motor, and the rotor of the electric motor being hollow and internally screwthreaded and cooperating with a screwthreaded rod fixed to the vehicle so as to ensure the axial displacement of the stator of the electric motor and therefore of the strap return element.

A better understanding of the invention will be had from the following description which is given solely by way of example with reference to the accompanying drawings, in which.

Figure 1:
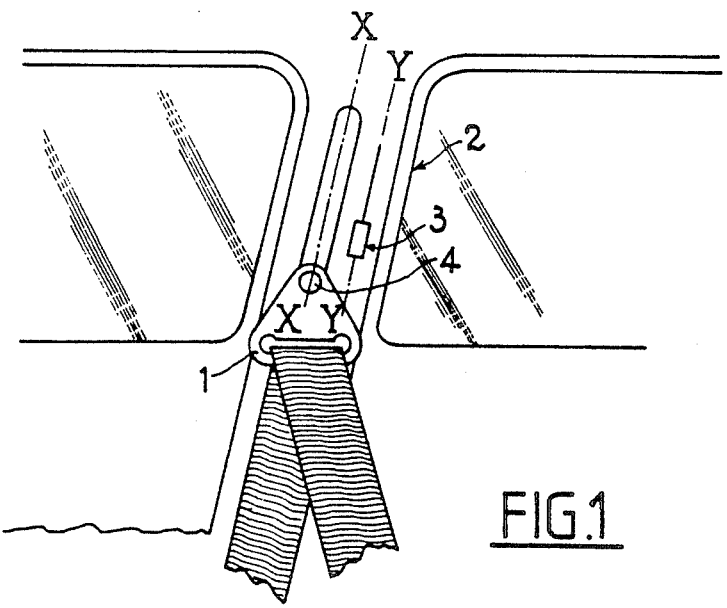
FIG. 1 is a view of a compartment of a vehicle equipped with an adjusting device according to the invention.

As can be seen in FIG. 1, a strap return element 1 is mounted to be movable along an axis X—X between two end positions along the vertical post 2 of a motor vehicle. This displacement is controlled, as will be seen hereinafter, by a slider 3 which is also mounted to be movable between two end positions along an axis Y—Y parallel to the axis X—X.

Figure 2:
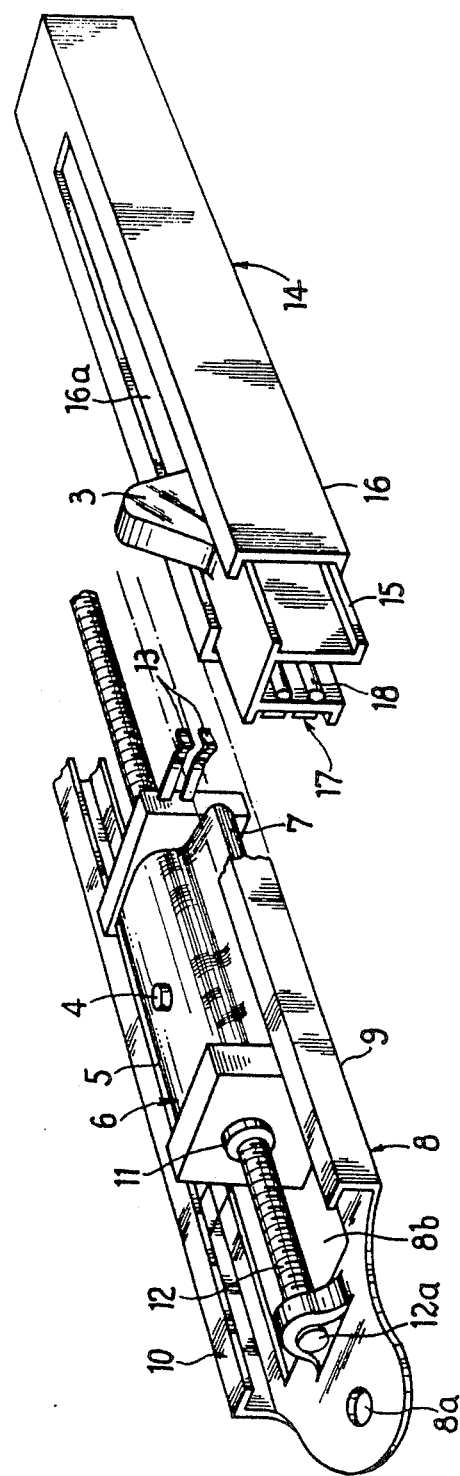
FIG. 2 is a view of an embodiment of an adjusting device according to the invention.

The strap return element is disposed on an anchoring pin 4 which, as can be seen in FIG. 2, is mounted on a stator 5 of an electric motor 6. This stator 5 has lateral projecting portions 7 which cooperate with means 8 for guiding the displacement of the motor and for retaining the latter, these means being fixed to the body of the vehicle, for example at 8a.

As can be seen in FIG. 2, the means for guiding the movement of the motor and retaining the motor comprise a metal plate having bent edge portions 9 and 10 which cooperate with the projecting portions of the stator. This plate also has an opening 8b in which the electric motor is slidable.

The rotor 11 of the electric motor is hollow and provided with an internal screwthread which cooperates with a screwthreaded rod 12 which extends through the motor and is fixed to the vehicle, so as to displace the motor axially between said two end positions. Advantageously, at least one, 12a, of the ends of this screwthreaded rod 12 is fixed to the metal plate constituting the guiding and retaining means for the electric motor.

The supply terminals of the electric motor are formed by brushes 13 mounted on the stator 5 of the motor and cooperating with a control element 14 controlling the position of the strap return element.

The control element 14 comprises a slide 15 mounted to be slidable in a slideway 16 by means of the aforementioned slider 3, the latter projecting out of the slideway through a slot 16a provided for this purpose in the slideway, so that the user has access to this slider for manually shifting the slide. The slide 15 has on the surface thereof in facing relation to the brushes 13 conductive tracks 17 adapted to cooperate with the brushes 13 for supplying current to the electric motor. These conductive tracks 17 are connected to the supply source of the vehicle by conductive wires 18.

Figure 3:
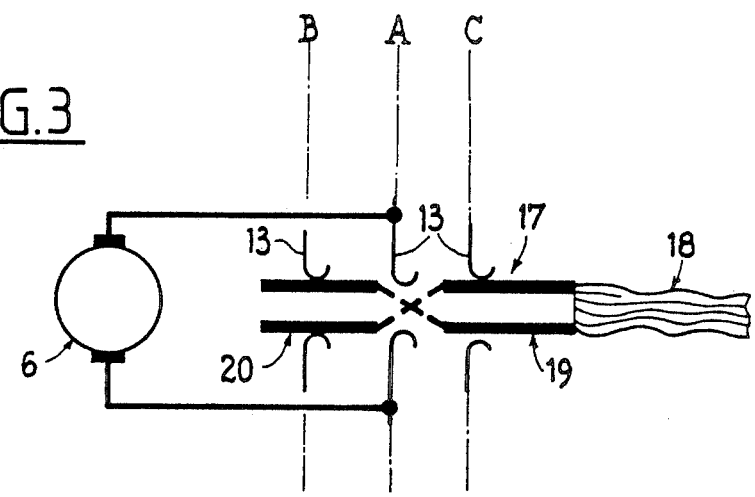
FIG. 3 is an electric diagram illustrating the operation of the adjusting device shown in FIG. 2.

As can be seen in FIG. 3, the slide includes two sets of conductive tracks 19 and 20 connected to the supply source of the vehicle in such manner as to have inverted polarities. Further, the two sets of tracks are separated by a gap in which the brushes 13 are no longer in contact with the conductive tracks, so that the supply of current to the electric motor is cut off.

Such a device operates in the following manner.

The position of rest of the device is that carrying the reference character A in FIG. 3, i.e. that in which the brushes 13 are in facing relation to the gap between the two sets of conductive tracks. In this case, no current is supplied to the motor and the anchoring pin 4, and consequently the strap return element 1, are in a given position.

If it is desired to shift this anchoring pin upwardly or downwardly, the slider 3 is manually acted upon for shifting the slide 15 in the slideway 16 and therefore the conductive tracks 17 relative to the brushes 13. The position indicated by the reference character B in FIG. 3 is then for example reached in which the brushes 13 are in contact with the set 20 of conductive tracks so that the rotor 11 of the motor 6 rotates in a given direction and causes the displacement of the motor in the guiding and retaining means.

As the stator of the motor is moved, the anchoring pin 4 of the strap return element and the brushes 13 are also moved until these brushes once again reach the position in facing relation to the gap between the two sets of conductive tracks.

The supply of current to the motor is then cut off and the motor is immobilized and determines a new position of the anchoring pin of the strap return element in accordance with the displacement of the slider.

The polarity of this set of tracks is inverted relative to that of the set 20 of tracks, and the electric motor is therefore supplied with current in the opposite direction and the rotor of this motor also rotates in the direction opposed to that of the preceding case. The motor then moves in the opposite direction so long as the brushes 13 do not resume a position in facing relation to the gap between the two sets of tracks. It will be understood that, as the strap return element is disposed on the anchoring pin mounted on this motor, it also follows this movement.

Thus, it can be seen that the slide and the elements associated therewith constitute means for setting the position of the strap return element at any point of the travel of this element, this travel being defined by the two end positions between which the strap return element is movable. The slider 3 enables the slide 15 to be shifted in such manner as to shift the gap between the two sets of tracks and to bring a set of tracks into contact with the brushes 13 for supplying current to the motor, so that it moves in the desired direction for raising or lowering the anchoring pin of the strap return element.

It will be understood that this element setting the position of the strap return element can be formed by an inverting switch having three positions of known type, whereby it is possible to supply current to the motor until it has reached the desired position and to cut off this supply when this position is reached. In this case, the inverting switch is connected to a single set of conductive tracks disposed on a fixed slide, these conductive tracks cooperating with brushes mounted on the stator of the electric motor so as to ensure the supply of current to the latter. These tracks are then connected to the supply source of the vehicle through the inverting switch, which permits inverting the polarity of these tracks for determining the direction of displacement of this motor, and therefore of the strap return element, and cutting off the supply of the motor when the desired adjusted position is reached.

Figure 4:
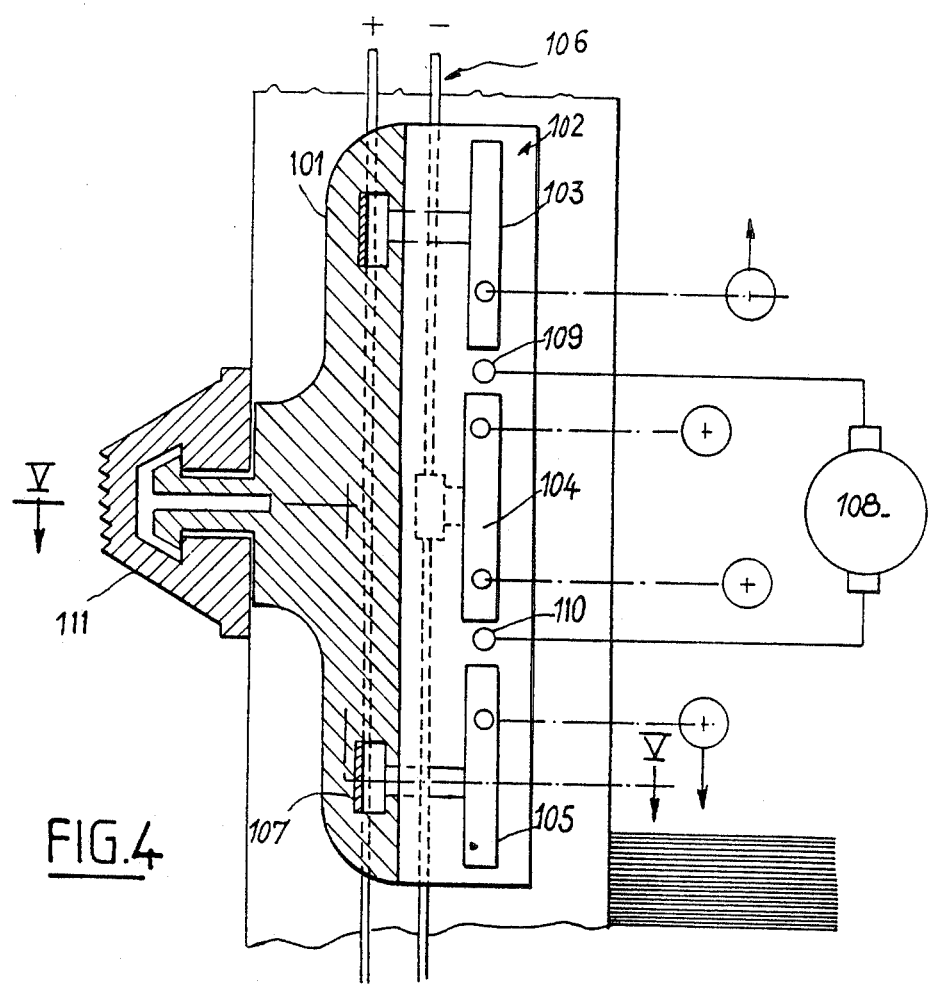
FIG. 4 is a bottom plan view of a modification of a control element forming part of a device according to the invention.

As can be seen in FIG. 4 which shows a modification of the control element controlling the position of the strap return element, this control element comprises a slide 101 on which is disposed a first set 102 of three conductive tracks, respectively 103, 104 and 105, which are substantially in alignment separated from one another by a gap for cutting off the supply of the electric motor, and connected to the supply source of the vehicle in such manner as to have successively alternating polarities. These conductive tracks are connected to a second set 106 of conductive tracks connected to the positive and negative terminals of the supply source of the vehicle through brushes, for example 107 for the conductive track 105. Thus, in the presently-described embodiment, the conductive tracks 103 and 105 have a positive polarity while the track 104 has a negative polarity.

The electric motor 108 for shifting the strap return element comprises two brushes 109 and 110 which, as illustrated in this Figure, are in facing relation to gaps separating the conducting track. These brushes 109 and 110 are adapted to cooperate with the conductive tracks 103, 104 so as to supply current to the motor and cause it to move in a given direction, or with the conductive tracks 104, 105 so as to cause the motor to move in the opposite direction. This control of the motor is a function of the displacement of the slide 101 relative to the brushes 109 and 110 supplying current to the motor. Indeed, a slider 111 mounted on the slide is mounted to be manually movable along the adjusting travel of the strap return element for adjusting the position of the slide 101, and therefore of the gaps cutting off the supply of the motor, and thus determining its position, and therefore the position of the strap return element.

As a function of the displacement of the slider and therefore of the slide, the electric motor is supplied with current in one direction or the other, until it reaches the desired position of adjustment in which the brushes 109 and 110 are in facing relation to the gaps cutting off the supply of the motor.

Figure 5:
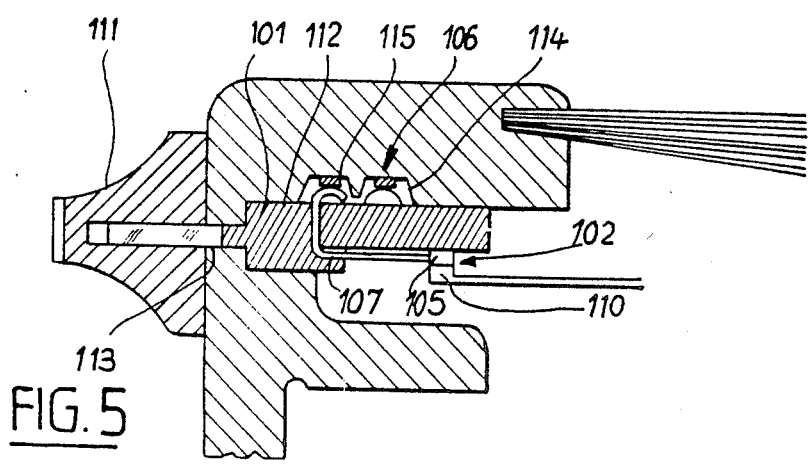
FIG. 5 is a sectional view taken on line V—V of FIG. 4.

As can be seen more clearly in FIG. 5, the slider 111 causes a displacement of the slide 101, which is for example in the form of an insulating plate, in a slideway 112 of any suitable support structure mounted on the vehicle. This support structure includes a slot 113 through which projects a part of the slide 101 on which the slider 111 is mounted. The conductive tracks of the set of tracks 106 are for example disposed in recesses 114 and 115 provided for this purpose in the support structure.

Further, in order to explain the operation of the device, the brush 112 of the motor is shown to bear against the conductive track 105.

As described before, the strap return element is mounted on the stator of the electric motor and the latter is axially movable between the two end positions, so that the adjustment of the position of the slider, and therefore of the gaps cutting off the supply of the motor, results in an adjustment of the position of the strap return element.

Note that, in the described embodiment, the brushes connecting the first set 102 of conductive tracks to the second set 106 of conductive tracks, for example the brush 107 in respect of the track 105, extend through the insulating plate constituting the slide.

What is claimed is:

1. A device for adjusting the vertical position of a strap return element, of in particular a safety belt for a motor vehicle, said device comprising said return element mounted to be movable between two end positions, an electric motor having a stator and a rotor, a control element, a source of current, means for connecting the source of current to the motor through the medium of the control element, an anchoring pin mounted on the stator of the motor, said return element being mounted on said anchoring pin, means for mounting on the vehicle for guiding and retaining the electric motor so that the electric motor is movable between said two end positions, said guiding and retaining means comprising a metal plate having bent edge portions and projecting portions on the stator which are cooperative with the edge portions of the plate, the rotor of the electric motor being hollow and carrying an internal screwthread, and screwthreaded rod for fixing to the vehicle and screwthreadedly engaged with the internal screwthread of the rotor for ensuring the axial displacement of the stator of the motor, and therefore of the strap return element, when the motor is supplied with current;

wherein said means for connecting the source of current to the electric motor comprise brushes mounted on the stator and cooperative with said control element; and wherein the control element comprises a slide and conductive tracks mounted on the slide, the conductive tracks being cooperative with the brushes for supplying current to the electric motor.

2. A device according to claim 1, wherein the slide comprises two sets of conductive tracks which are connected to said source of current in such manner as to have inverted polarities and are separated by a gap for cutting off the supply of current to the electric motor and determining the position of the latter when the brushes reach the respective gaps.

3. A device according to claim 2, comprising a slideway for mounting on the vehicle and including a slot, the slide being movably mounted in the slideway, a slider mounted on the slide and projecting through the slot in the slideway, the slider being manually movable so as to adjust the position of the gaps cutting off the supply of current to the motor and thereby determine the position of the motor and therefore the position of the strap return element.

4. A device according to claim 1, wherein the slide includes a first set of three conductive tracks which are substantially in alignment and separated from one another by a gap for cutting off the supply of current to the electric motor and therefore determining the position of the electric motor, and connected to the source of current in such manner as to have successively alternating polarities.

5. A device according to claim 4, comprising a support structure for mounting on the vehicle and including a slideway which defines a slot, the slide being movably mounted in the slideway and having a part which projects through the slot of the slideway and a slider carried by the projecting part of the slide, the slider and the slide being manually movable in the slot of the slideway along the travel of adjustment of the strap return element so as to adjust the position of the gaps for cutting off the supply of current to the motor and determine the position of the motor and the position of the strap return element.

6. A device according to claim 4, comprising a second set of tracks connected to the source of current and second brushes cooperative with the second set of tracks, the first-mentioned set of conductive tracks being connected to the source of current of the vehicle through the second brushes and the second set of conductive tracks.

7. A device according to claim 1, wherein at least one end of said screwthreaded rod is mounted on the metal plate.

8. A device for adjusting the vertical position of a strap return element, of in particular a safety belt for a motor vehicle, said device comprising said return element mounted to be movable between two end positions, an electric motor having a stator and a rotor, a control element, a source of current, means for connecting the source of current to the motor through the medium of the control element, an anchoring pin mounted on the stator of the motor, said return element being mounted on said anchoring pin, means for mounting on the vehicle for guiding and retaining the electric motor so that the electric motor is movable between said two end positions, said guiding and retaining means comprising a metal plate having bent edge portions and projecting portions on the stator which are cooperative with the edge portions of the plate, the rotor of the electric motor being hollow and carrying an internal screwthread, a screwthreaded rod for fixing to the vehicle and screwthreadedly engaged with the internal screwthread of the rotor for ensuring the axial displacement of the stator of the motor, and therefore of the strap return element, when the motor is supplied with current;

wherein said means for connecting the source of current to the electric motor comprise brushes mounted on the stator of the motor and fixed conductive tracks connected to the source of current through said control element, said brushes being cooperative with the conductive tracks; and wherein the control element comprises an inverting switch having three positions permitting the connection of said conductive tracks to the source of current in such manner as to cause the electric motor, and therefore the strap return element mounted thereon, to selectively move in one direction and the other toward the desired position, and the cut off of said supply of the current when this desired position is reached.

9. A device according to claim 8, wherein at least one end of said screwthreaded rod is mounted on the metal plate.

* * * * *